(12) United States Patent
Lorenz

(10) Patent No.: US 10,670,084 B2
(45) Date of Patent: Jun. 2, 2020

(54) CLUTCH DEVICE FOR A HYBRID DRIVE SYSTEM

(71) Applicant: SCHAEFFLER TECHNOLOGIES AG & CO. KG, Herzogenaurach (DE)

(72) Inventor: Elmar Lorenz, Rheinmuenster Soellingen (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/749,970

(22) PCT Filed: Aug. 11, 2016

(86) PCT No.: PCT/DE2016/200370
§ 371 (c)(1),
(2) Date: Feb. 2, 2018

(87) PCT Pub. No.: WO2017/028857
PCT Pub. Date: Feb. 23, 2017

(65) Prior Publication Data
US 2018/0238401 A1 Aug. 23, 2018

(30) Foreign Application Priority Data

Aug. 20, 2015 (DE) .................. 10 2015 215 876

(51) Int. Cl.
*F16D 21/06* (2006.01)
*F16D 25/10* (2006.01)
(Continued)

(52) U.S. Cl.
CPC .............. *F16D 21/06* (2013.01); *B60K 6/387* (2013.01); *F16D 13/46* (2013.01); *F16D 13/52* (2013.01);
(Continued)

(58) Field of Classification Search
CPC .......... F16D 21/06; F16D 13/46; F16D 13/52; F16D 13/683; F16D 25/10; B60K 6/387
See application file for complete search history.

(56) References Cited

U.S. PATENT DOCUMENTS 6,139,463 A * 10/2000 Kasuya ................... F16H 3/663
475/275
6,929,107 B2 8/2005 Hegerath
(Continued)

FOREIGN PATENT DOCUMENTS

CN 103032482 A 4/2013
DE 102007003107 A1 8/2007
(Continued)

OTHER PUBLICATIONS

Machine translation of EP2287487, retrieved from www.espacenet.com (Year: 2019).*
(Continued)

*Primary Examiner* — Stacey A Fluhart
(74) *Attorney, Agent, or Firm* — Brooks Kushman P.C.

(57) ABSTRACT

A drive device comprising, a housing configured to delimit a housing inner chamber that can be filled with a cooling fluid and a clutch device that includes a first input side coupled to a first drive motor, a second input side, wherein the first and second input side can be rotated about a common rotation axis. The clutch device further includes a first output side, a second output side, a first clutch arranged between the first input side and the first output side, and a second clutch arranged between the second input side and the second output side.

16 Claims, 3 Drawing Sheets

(51) Int. Cl.
*B60K 6/387* (2007.10)
*F16D 13/46* (2006.01)
*F16D 13/52* (2006.01)
*F16D 13/68* (2006.01)

(52) U.S. Cl.
CPC ........... *F16D 13/683* (2013.01); *F16D 25/10* (2013.01); *B60Y 2200/92* (2013.01); *F16D 2021/0607* (2013.01); *F16D 2021/0661* (2013.01); *F16D 2021/0669* (2013.01); *F16D 2300/06* (2013.01); *F16D 2300/26* (2013.01); *Y10S 903/914* (2013.01)

(56) References Cited

U.S. PATENT DOCUMENTS

| | | | | |
|---|---|---|---|---|
| 8,322,503 | B2* | 12/2012 | Combes | B60K 6/26 192/48.8 |
| 8,453,817 | B2 | 6/2013 | Schrage | |
| 8,757,305 | B2 | 6/2014 | Roske et al. | |
| 8,905,210 | B2 | 12/2014 | Hauck | |
| 9,193,255 | B2* | 11/2015 | Arnold | B60K 6/36 |
| 2008/0093135 | A1* | 4/2008 | Nomura | B60K 6/26 180/65.24 |
| 2015/0024903 | A1 | 1/2015 | Jeong et al. | |
| 2015/0033889 | A1* | 2/2015 | Shibata | F16H 57/029 74/421 A |
| 2017/0203643 | A1* | 7/2017 | Suyama | B60K 6/387 |
| 2017/0261045 | A1* | 9/2017 | Chamberlin | B60K 6/26 |

FOREIGN PATENT DOCUMENTS

| | | | | |
|---|---|---|---|---|
| DE | 102009006422 | A1 | 7/2010 | |
| DE | 102009059944 | A1 | 7/2010 | |
| DE | 102009030135 | A1 | 12/2010 | |
| DE | 102009047953 | A1 | 4/2011 | |
| DE | 102010003442 | A1 | 10/2011 | |
| DE | 102010021035 | A1 | 11/2011 | |
| DE | 102010021899 | A1 | 12/2011 | |
| EP | 1195537 | A1 | 4/2002 | |
| EP | 2287487 | A1 * | 2/2011 | B60K 6/387 |
| EP | 2517915 | A1 | 10/2012 | |
| JP | 2003039961 | A * | 2/2003 | |

OTHER PUBLICATIONS

International Search Report for Application No. PCT/DE2016/200370, dated Nov. 9, 2016, 7 pages.
Chinese Office Action for Application No. 201680044551.5, dated Jan. 24, 2019, 8 Pages.
German Search Report for Application No. 16 765 917.6, dated Aug. 21, 2019, 4 pages.

* cited by examiner

CLUTCH DEVICE FOR A HYBRID DRIVE SYSTEM

CROSS-REFERENCE TO RELATED APPLICATIONS

This application is the U.S. National Phase of PCT/DE2016/200370 filed Aug. 11, 2016, which claims priority to DE 102015215876.4 filed Aug. 20, 2015, the entire disclosures of which are incorporated by reference herein.

TECHNICAL FIELD

The disclosure relates to a clutch device as described below. In particular, the disclosure concerns a clutch device for a hybrid drive system.

BACKGROUND

A motor vehicle has a first drive motor which is configured as an electrical machine, and a second drive motor which is configured as an internal combustion engine. The motor vehicle drive may be hybrid, i.e. use any arbitrary combination of the first and/or second drive motors. For this, a clutch device is provided between the drive motors and a transmission of the motor vehicle.

DE 10 2009 059 944 A1 describes a clutch device for a motor vehicle with hybrid drive.

SUMMARY

It is an object of the disclosure to provide an improved drive device. This object is achieved by a drive device according to the disclosure below. Advantageous embodiments are specified as well below.

It has been found that an improved drive device can be provided if the drive device comprises a clutch device, a housing and a first drive motor. The clutch device comprises a first input side, a second input side, a first output side, a second output side, a first clutch, a second clutch and a third clutch. The input sides and the output sides can be rotated about a common rotation axis. The first input side is coupled by torque engagement to the first drive motor. The second input side can be coupled to a second drive motor. The first clutch is arranged between the first input side and the first output side. The second clutch is arranged between the first input side and the second output side. The third clutch is arranged between the first input side and the second input side. The housing at least in portions delimits a housing inner chamber. The housing inner chamber can be filled with a cooling fluid. The clutch device and the first drive motor are arranged in the housing inner chamber.

This embodiment has the advantage that the clutch device and the first drive motor can be cooled jointly by using the cooling fluid. This prevents overheating of both the first drive motor and the clutch device.

In a further embodiment, the first drive motor comprises a stator and a rotor. The rotor is arranged radially outside the first clutch and/or the second clutch. The rotor at least partially overlaps axially the first and/or the second clutch. The stator is arranged radially outside the rotor. This embodiment has the advantage that the drive device is formed particularly compactly in the axial direction. Furthermore, a high torque can be introduced into the clutch device by the drive motor.

In a further embodiment, the first clutch and the second clutch are arranged radially substantially at the same level and axially offset to each other. The first clutch comprises a first plate carrier and the second clutch comprises a second plate carrier. The first plate carrier has a first inner toothing. The second plate carrier has a second inner toothing. The first and second plate carriers are connected by torque engagement to the rotor. The clutch device comprises a connecting element. The connecting element connects the rotor by torque engagement to the first and/or second plate carrier.

In a further embodiment, the connecting element is formed U-shaped at least in portions. Alternatively, the connecting element is formed disc-like or cylindrical.

The object is however also achieved by a drive device as further discussed in the disclosure below.

It has been found that an improved drive device can be provided if the drive device comprises a clutch device, a housing and a first drive motor. The clutch device comprises a first input side, a second input side, a first output side, a second output side, a first clutch, a second clutch and a third clutch. The input sides and the output sides can be rotated about a common rotation axis. The first input side is coupled by torque engagement to the first drive motor. The second input side can be coupled to a second drive motor. The first clutch is arranged between the first input side and the first output side. The second clutch is arranged between the first input side and the second output side. The housing at least in portions delimits a first housing inner chamber and a second housing inner chamber. The second housing inner chamber can be filled with a cooling fluid. The first housing inner chamber is substantially free from cooling fluid. The clutch device is arranged in the second housing inner chamber and the first drive motor is arranged in the first housing inner chamber.

This embodiment has the advantage that flange losses of cooling fluid in the first drive motor are avoided. In this way, the drive device can be operated particularly energy-efficiently.

In a further embodiment, the first drive motor comprises a stator and a rotor. The rotor is arranged radially outside the first clutch and/or the second clutch. The rotor at least partially overlaps axially the first and/or the second clutch. The stator is arranged radially outside the rotor. This embodiment has the advantage that the drive device is formed particularly compactly in the axial direction. Furthermore, a high torque can be introduced into the clutch device by the drive motor.

In a further embodiment, the first clutch and the second clutch are arranged radially substantially at the same level and axially offset to each other. The first clutch comprises a first plate carrier and the second clutch comprises a second plate carrier. The first plate carrier has a first inner toothing. The second plate carrier has a second inner toothing. The first and second plate carriers are connected by torque engagement to the rotor. The clutch device comprises a connecting element. The connecting element connects the rotor by torque engagement to the first and/or second plate carrier.

In a further embodiment, the connecting element is formed U-shaped at least in portions. Alternatively, the connecting element is formed disc-like or cylindrical.

In a further embodiment, the connecting element comprises a first portion, a second portion and at least one third portion. The second portion connects the first portion to the third portion. The first portion and the third portion are arranged substantially parallel to the rotation axis. The third portion is arranged radially on the inside to the first portion. The rotor is attached to the first portion radially outside the first portion. The first and second plate carriers are attached to the third portion radially inside the third portion.

In a further embodiment, the housing comprises a housing portion and at least one sealing element. The sealing element is arranged between the connecting element and the housing portion. The sealing element and the connecting portion fluidically separate the first housing inner chamber from the second housing inner chamber. This avoids an overflow of cooling fluid radially towards the outside from the second housing inner chamber to the first housing inner chamber.

BRIEF DESCRIPTION OF THE DRAWINGS

The disclosure is explained in more detail below with reference to the figures. The drawing shows.

DETAILED DESCRIPTION

Figure 1:
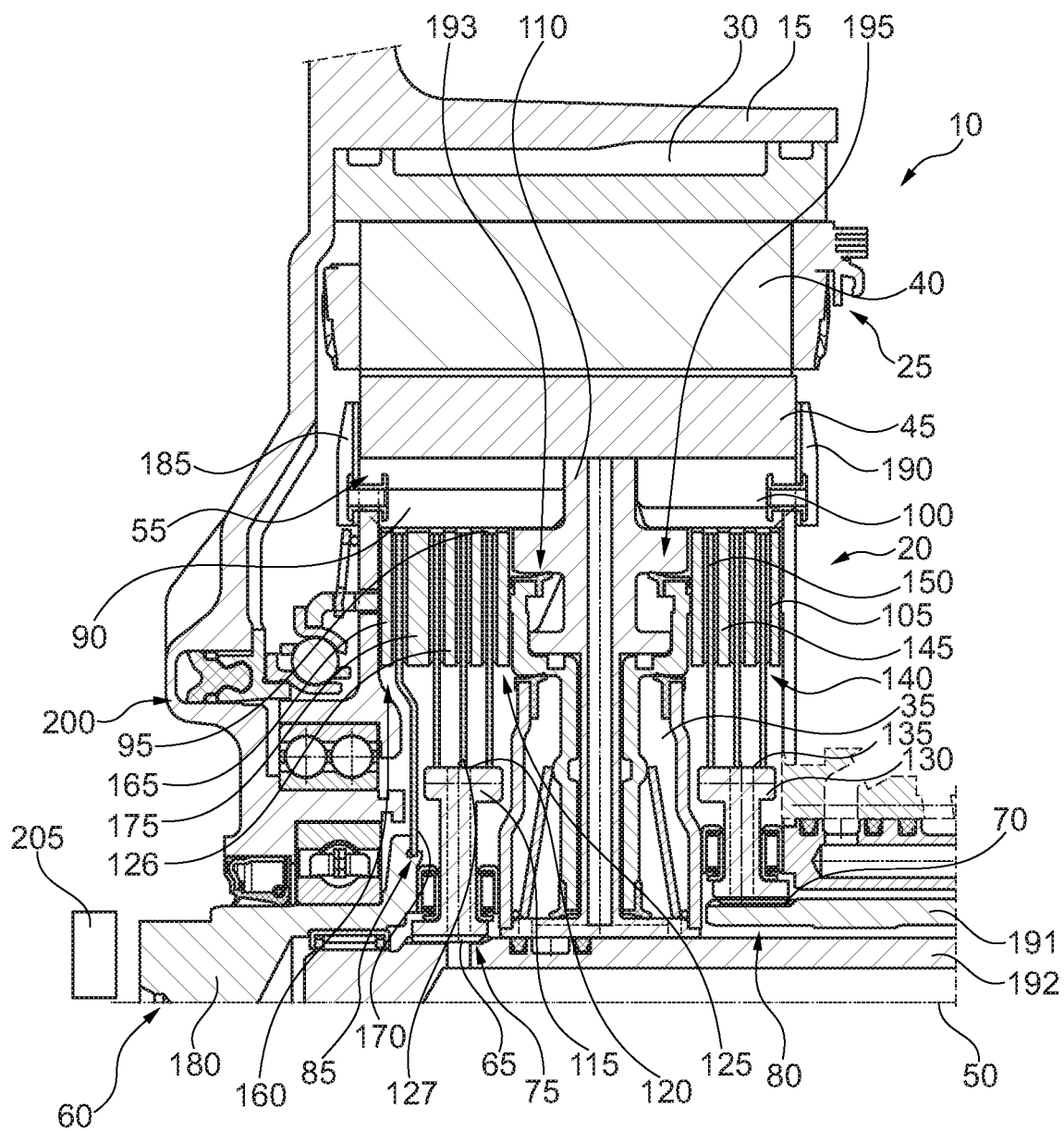
FIG. 1 a half longitudinal section through a drive device according to a first embodiment.

FIG. 1 shows a half longitudinal section through a drive device 10 according to a first embodiment.

The drive device 10 has a housing 15, a clutch device 20 and a first drive motor 25. The housing 15 delimits a housing inner chamber 30. The housing inner chamber 30 can be filled with a cooling fluid 35.

The first drive motor 25 and the clutch device 20 are arranged in the housing inner chamber 30. The first drive motor 25 is configured as an electrical machine. The first drive motor 25 comprises a stator 40 and a rotor 45 and is mounted rotatably about a rotation axis 50. The stator 40 is fixedly connected to the housing 15. The first drive motor 25 may be an internal rotor type, so that the stator 40 is arranged radially outside the rotor 45. The stator 40 may include at least one magnetic coil, and the rotor 45 comprises at least one permanent magnet. The first drive motor 25 is arranged radially outside the clutch device 20.

The clutch device 20 has a first input side 55, a second input side 60, a first output side 65 and a second output side 70. The first input side 55, the second input side 60, the first output side 65 and the second output side 70 are arranged rotatably about the rotation axis 50.

Furthermore, the clutch device 20 has a first clutch 75, a second clutch 80 and a third clutch 85. The first clutch 75 lies between the first input side 55 and the first output side 65. The second clutch 80 lies between the second input side 60 and the second output side 70. The third clutch 85 is arranged between the first input side 55 and the second input side 60. In this embodiment, the clutches 75, 80, 85 are arranged radially at the same level. The first clutch 75 is arranged axially between the third clutch 85 and the second clutch 80.

The rotor 45 is here arranged axially overlapping the clutches 75, 80, 85. An axial overlap here means that if the rotor 45 and the clutches 75, 80, 85 are projected into a plane in which the rotation axis 50 is arranged, they overlap each other. In this way, the clutches 75, 80, 85 and the rotor 45 have a common installation space.

The first clutch 75 comprises a first plate carrier 90. The first plate carrier 90 has a first inner toothing 95. Furthermore, the second clutch 80 comprises a second plate carrier 100 with a second inner toothing 105. A flange 110 is arranged axially between the first plate carrier 90 and the second plate carrier 100. The flange 110 is connected by torque engagement to the first plate carrier 90 and the second plate carrier 100. Furthermore, the first plate carrier 90 and the second plate carrier 100 are connected together by torque engagement.

The first clutch 75 comprises a third plate carrier 115. The third plate carrier 115 has a first outer toothing 120. The first plate carrier 90 and the third plate carrier 115 form a first ring gap in which a first friction packet 125 is arranged.

The first friction packet 125 comprises a first friction partner 126 and a second friction partner 127. The friction partners 126, 127 may preferably be arranged alternating with each other in a stack. In this embodiment, for example, the first friction partner 126 is formed as a lining-free friction plate, and the second friction partner 127 as a lining-carrying plate. Other embodiments of the first and/or second friction partners 126, 127 are also conceivable. The first friction partner 126 is connected by torque engagement to the first plate carrier 90 via the first inner toothing 95. The second friction partner 127 is connected by torque engagement to the third plate carrier 115 via the first outer toothing 120.

The second clutch 80 comprises a fourth plate carrier 130 with a second outer toothing 135. The second plate carrier 100 and the fourth plate carrier 130 form a second ring gap. A second friction packet 140 of the second clutch 80 is arranged in the second ring gap.

The second friction packet 140 comprises a third friction partner 145 and a fourth friction partner 150. The third friction partner 145 is formed as a lining-free plate, while for example the fourth friction partner 150 is formed as a lining-carrying plate. Naturally, other embodiments of the third and fourth friction partners 145, 150 are also conceivable.

The third clutch 85 has a third friction packet 160 with a fifth friction partner 165 and a sixth friction partner 170. The fifth friction partner 165 is formed as a lining-free plate, while for example the sixth friction partner 170 is formed as a lining-carrying plate. The fifth and sixth friction partners 165, 170 may also be configured differently. A support element 175, which is fixed in its axial position and connected to the first plate carrier 90, is provided axially between the first friction packet 125 and the third friction packet 160.

The third friction packet 160 is arranged radially level with the first and second friction packets 125, 140. The first friction partner 165 is connected by torque engagement to the first plate carrier 90 via the first inner toothing 95.

The second input side 60 comprises a clutch rotor 180. The clutch rotor 180 is connected by torque engagement to the sixth friction partner 170 of the third friction packet 160.

The clutch device 20 furthermore comprises a first connecting element 185 and a second connecting element 190. The connecting element 185, 190 may be formed as a disc. The connecting element 185, 190 here extends radially approximately from the first plate carrier 90 and the second plate carrier 100 to radially level with the rotor 45 of the electrical machine 25. The first connecting element 185 is here connected to the first plate carrier 90 and the rotor 45 preferably via a form-fit connection, in particular by using a rivet connection, so that the first input side 55 is connected to the rotor 45 of the electrical machine 25. Similarly, the second connecting element 190 connects the second plate carrier 100 to the rotor 45. The second connecting element 190 is here configured mirror-symmetrically relative to the flange 110 and connects the second plate carrier 100 to the rotor 45 by torque engagement. Also, one of the two connecting elements 185, 190 may be omitted since the first plate carrier 90 is also connected by torque engagement to the second plate carrier 100 via the flange 110.

The third plate carrier 115 is connected radially on the inside to the first output side 65. The first output side 65 is connected to a first gearbox input shaft 191 of a double gearbox. The fourth plate carrier 130 is connected to the second output side 70. The second output side 70 is connected to a second gearbox input shaft 192 of the double gearbox. The double gearbox normally couples each of the gearbox input shafts 191, 192 via a separate gearwheel pair to a common output shaft, which in turn acts on a drive wheel of the motor vehicle. In order to select a gear of the double gearbox, the first clutch 75 and/or the second clutch 80 is closed while the respective other clutch 75, 80 may remain open. The double gearbox may include several gearwheel pairs, only one of which is engaged at a time.

To close and open the first clutch 75, the first clutch 75 comprises a first actuator device 193. Furthermore, the second clutch 80 comprises a second actuator device 195, and the third clutch 85 comprises a third actuator device 200. All of the actuator devices 193, 195, 200 may work hydraulically and may be configured to exert an axial actuating force on the assigned friction packet 120, 140, 160, so that the friction partners 126, 127, 145, 150, 165, 170 are pressed together axially in order to create a frictional engagement and transmit a torque between the friction partners 126, 127, 145, 150, 165, 170. The friction partners 126, 127, 145, 150, 165, 170 may be in each case pressed together between the assigned actuator device 193, 195, 200 and an axial thrust bearing. The axial thrust bearing may here be formed by the support element 175 for the first friction packet 125. Furthermore, for the second friction packet 140, the axial thrust bearing may be formed by a radial portion of the second plate carrier 100, and for the third friction packet 160 by a radial portion of the first plate carrier 90. Furthermore, the hydraulic actuator devices 193, 195, 200 may be actively controlled individually and/or together in that, by using a valve or pump, pressurized pressure medium is deliberately introduced into or discharged from a hydraulic pressure chamber of the actuator device 191, 195, 200. Alternatively for example, a centrifugal oil-controlled actuator device 193, 195, 200 may be provided. The axial forces of the actuator device 193, 195, 200 may be supported inside the clutch device 20, so that no resulting forces need be supported externally.

The second input side 60 may be connected by torque engagement to a second drive motor 205, which for example is configured as an internal combustion engine. In this way the drive device 10 is suitable in particular for use in a drive train of the motor vehicle. The motor vehicle may preferably be operated with hybrid drive, i.e. either by the first drive motor 25, by the second drive motor 205 or by both drive motors 25, 205 together. If the second drive motor 205—preferably the internal combustion engine—is used, the third clutch 85 is closed by the third actuator device 200. In this way, the second input side 60 is connected by torque engagement to the first input side 55. If the first drive motor 25—i.e. the electric machine—is used, it is normally actuated electrically such that a torque is implemented. The two drive motors 25, 205 may apply both positive and negative torque to the drive device 10. The first drive motor 25 may also receive kinetic energy from the drive train and convert this into electrical energy, which for example may be temporarily stored in an energy accumulator. Because of its compact structure, the drive device 10 is particularly suitable for installation transversely at the front of the motor vehicle.

The clutches 75, 80, 85 and the first drive motor 25 are arranged in the common housing inner chamber 30, so that cooling fluid 35 can flow both to the clutches 75, 80, 85 and also to the first drive motor 25.

The cooling fluid 35 may also be used as a working medium for the actuator device 191, 195, 200. The clutches 75, 80, 85 are for example of the wet-running type and may each be designed as a single plate or multiplate clutch. Further preferably, the first clutch 75 and the second clutch 80 are of the multiplate type, in order to allow finely-controlled opening and closing of the torque flow between the first input side 55 and the first output side 65 and/or the second output side 70. The third clutch 85, as shown in FIG. 1, may be of the single plate type. The third clutch 85 may also be of the multiplate type. The third clutch 85 may however also be designed as a shift clutch which as far as possible is not operated under slip.

Figure 2:
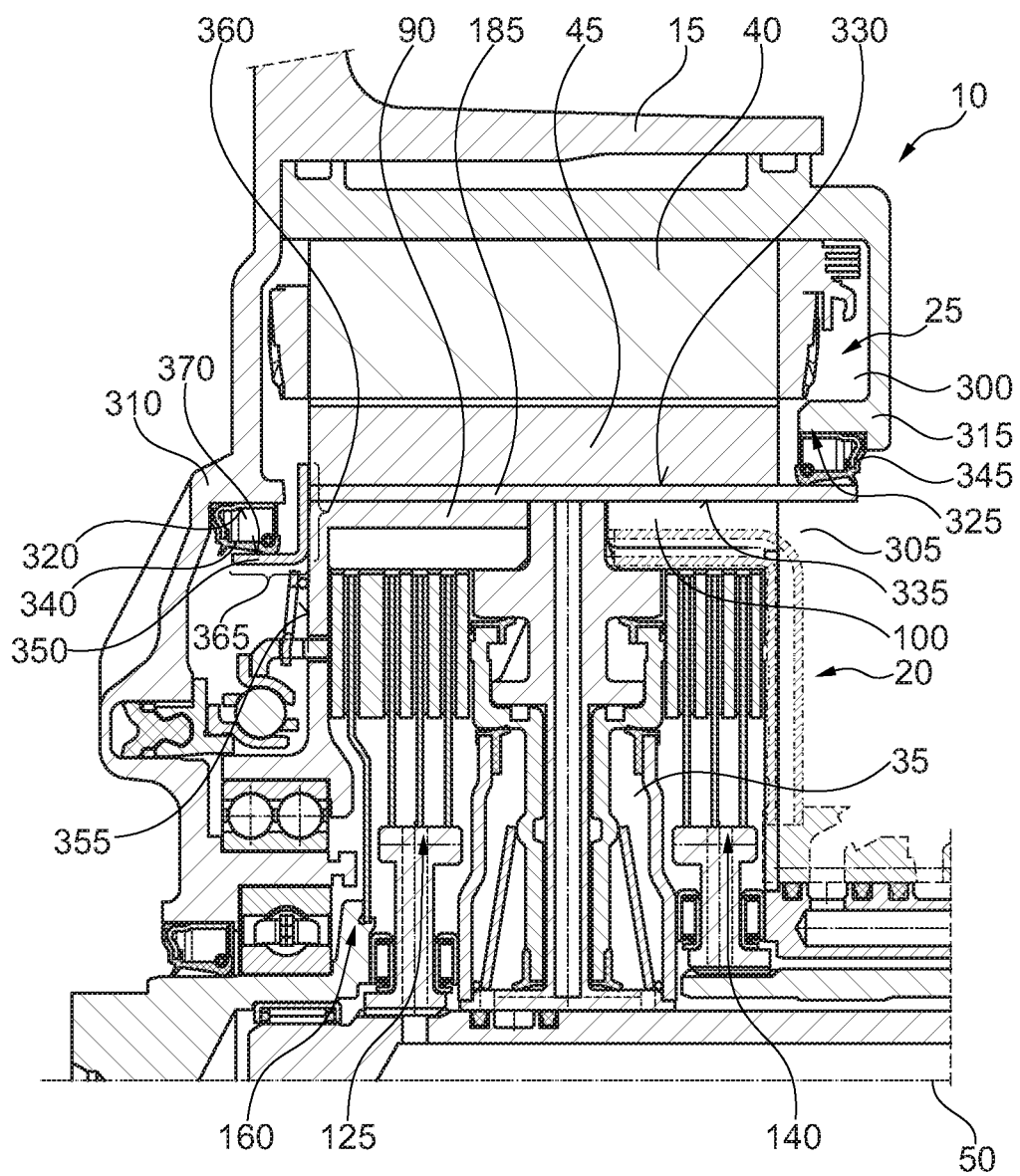
FIG. 2 a half longitudinal section through a drive device according to a second embodiment.

FIG. 2 shows a half longitudinal section through a drive device 10 according to a second embodiment. The drive device 10 is configured similarly to the drive device 10 shown in FIG. 1. By deviation therefrom, the housing 15 comprises a first housing inner chamber 300 and a second housing inner chamber 305. The first housing inner chamber 300 is formed dry so that, preferably, no cooling fluid 35 is provided in the first housing inner chamber 300. The second housing inner chamber 305 is formed as a wet chamber. The cooling fluid 35 is arranged in the second housing inner chamber 305.

The first drive motor 25 is arranged in the first housing inner chamber 300. The clutch device 20 is arranged in the second housing inner chamber 305.

The housing 15 comprises a first housing portion 310 and a second housing portion 315. The first housing portion 310 extends substantially radially and has a first seal seat 320. The first seal seat 320 is here configured cylindrically around the rotation axis 50.

The second housing portion 315 has a second seal seat 325. The second seal seat 325 is formed cylindrically around the rotation axis 50 and for example has a different diameter from the first seal seat 320.

By deviation from FIG. 1, the clutch device 20 has only one connecting element 185. The connecting element 185 may be formed so as to be cylindrical. The rotor 45 is connected to the connecting element 185 by torque engagement on an outer peripheral face 330 of the connecting element 185. The first plate carrier 90 is connected by torque engagement to the connecting element 185 on an inner peripheral face 335 of the connecting element 185, and the second plate carrier 100 is connected to the connecting element 185. The connection between the connecting element 185 and the first plate carrier 90 and the second plate carrier 100 may be formed by form fit and/or material fit and/or force fit. Similarly, the rotor 45 may be connected to the connecting element 185 by material fit and/or by force fit and/or by form fit.

The housing 15 furthermore comprises a first sealing element 340 and a second sealing element 345. The sealing elements 340, 345 in this embodiment are configured for example as radial sealing rings. The sealing elements 340, 345 may also be configured differently, for example as O-rings. The sealing elements 340, 345 are arranged axially on opposite sides of the first plate carrier 90 and the second plate carrier 100, so that the friction packets 125, 140, 160 are arranged axially between the sealing elements 340, 345. The second seal seat 325 is arranged axially overlapping with a partial region of the connecting element 185, wherein the second sealing element 345 is arranged between the second seal seat 325 and the outer peripheral face 330 of the connecting element 185. Furthermore, the clutch device 20 may comprise a separating element 350, which is formed L-shaped for example and attached to an end face 355 of the first plate carrier 90. The separating element 350 here terminates with a radial portion 360 radially outside the connecting element 185. The separating element 350 furthermore has an axial portion 365 which is arranged for example at right angles to the radial portion 360. The axial portion 365 is arranged radially inside the connecting element 185. The first sealing element 340 is arranged between an outer peripheral face 370 of the axial portion 365 and the first seal seat 320, which is arranged axially partly overlapping the outer peripheral face 330 of the separating element 350.

The separating element 350 may here be formed integrally with and of the same material as the connecting element 185. Also, the connecting element 185 and the separating element 350 may be formed multipiece as shown in FIG. 2.

The sealing elements 340, 345, the separating element 350 and the connecting element 185 may fluidically separate the first housing inner chamber 300 from the second housing inner chamber 305. Thus cooling for the clutch device 20 may be ensured, while possible flange losses in the first drive motor 25 from the cooling fluid 35 are avoided.

Figure 3:
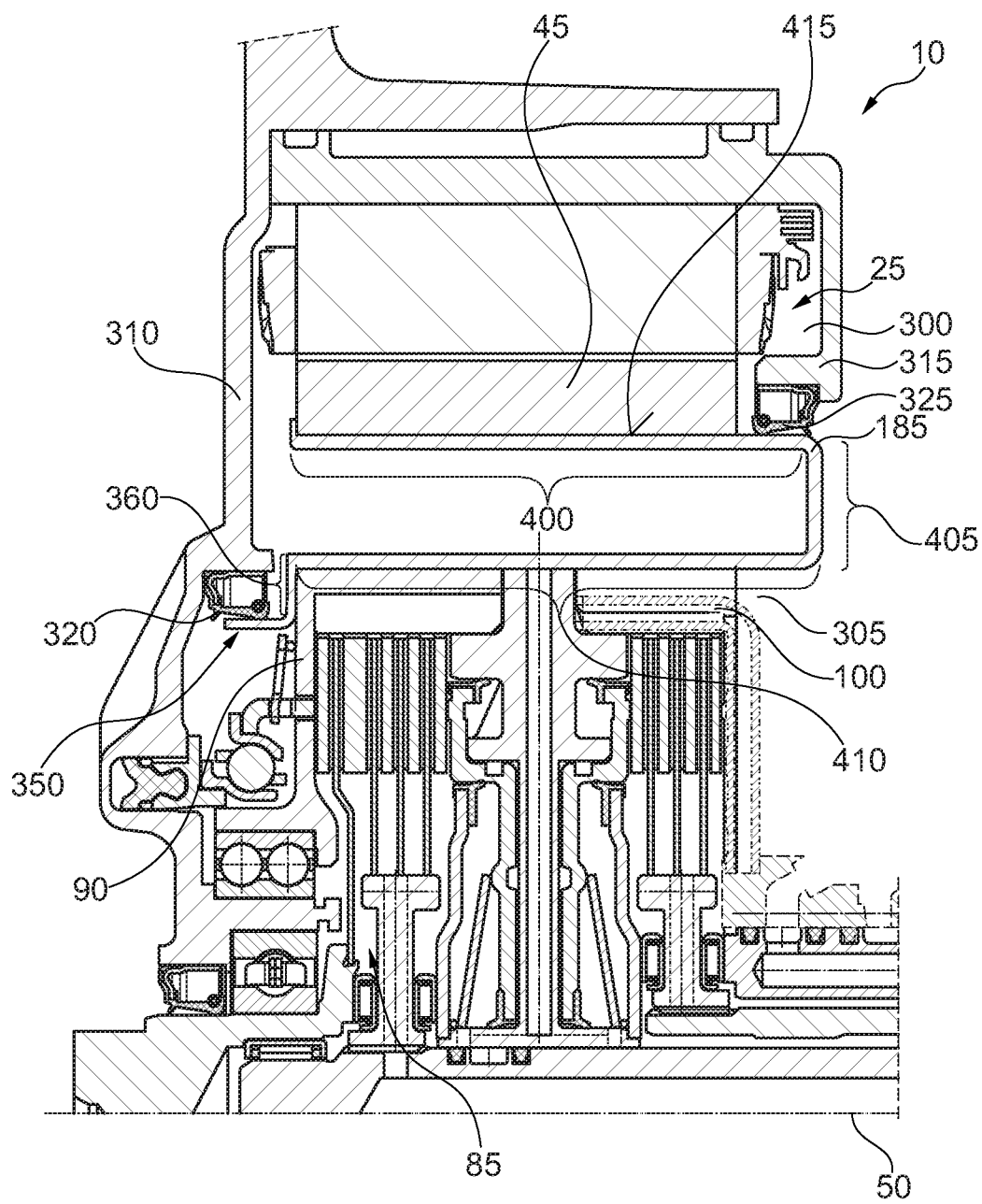
FIG. 3 a half longitudinal section through a drive device according to a third embodiment.

FIG. 3 shows a half longitudinal section through a drive device 10 according to a third embodiment. The drive device 10 is configured similarly to the drive device 10 shown in FIG. 2. By deviation from this, the connecting element 185 and the separating element 350 shown in FIG. 2 are configured integrally and of the same material. Furthermore, the connecting element 185 comprises a first portion 400, a second portion 405 and a third portion 410. The first portion 400 and the third portion 410 are oriented parallel to the rotation axis 50. The third portion 410 is arranged radially inside the first portion 400. For example, the second portion 405 is arranged in a rotational plane relative to the rotation axis 50. The second portion 405 connects the first portion 400 to the third portion 410. This gives a U-shaped cross-section of the connecting element 185. The rotor 45 of the first drive motor 25 sits on an outer peripheral face 415 of the first portion 400 and is connected to the first portion 400 by torque engagement. Furthermore, the second sealing element 345 lies on the outer peripheral face 415 of the first portion 400.

The first plate carrier 90 and the second plate carrier 100 are connected to the third portion 410 by torque engagement radially inside the third portion 410. On the end face, on a side facing the third clutch 85, the third portion 410 is connected to a radially outer end of the radial portion 360.

Due to the U-shaped design of the connecting element 185, the first sealing element 340 is also arranged radially offset to the second sealing element 345.

It is pointed out that the features of the drive devices 10 described above may evidently be combined with each other. It is also conceivable that the clutch device 20 is used in a drive train without a second drive motor 205. In this case, the third clutch 85 may be omitted. The first input side 55 and the second input side 60 then coincide.

LIST OF REFERENCE DESIGNATIONS

10 Drive device
15 Housing
20 Clutch device
25 First drive motor
30 Housing inner chamber
35 Cooling fluid
40 Stator
45 Rotor
50 Rotation axis
55 First input side
60 Second input side
65 First output side
70 Second output side
75 First clutch
80 Second clutch
85 Third clutch
90 First plate carrier
95 First inner toothing
100 Second plate carrier
105 Second inner toothing
110 Flange
115 Third plate carrier
120 First outer toothing
125 First friction packet
126 First friction partner
127 Second friction partner
130 Fourth plate carrier
135 Second outer toothing
140 Second friction packet
145 Third friction partner
150 Fourth friction partner
160 Third friction packet
165 Fifth friction partner
170 Sixth friction partner
175 Support element
180 Rotor
185 First connecting element
190 Second connecting element
191 First gearbox input shaft
192 Second gearbox input shaft
193 First actuator device
195 Second actuator device
200 Third actuator device
205 Second drive motor
300 First housing inner chamber
305 Second housing inner chamber
310 First housing portion
315 Second housing portion
320 First seal seat
325 Second seal seat
330 Outer peripheral face
335 Inner peripheral face
340 First sealing element
345 Second sealing element
350 Separating element
355 End face of first plate carrier
360 Radial portion
365 Axial portion
400 First portion
405 Second portion
410 Third portion
415 Outer peripheral face of first portion

The invention claimed is:

1. A drive device, comprising:
a clutch device;
a housing; and
a first drive motor, wherein the clutch device includes a first input, a second input, a first output, a second output, a first clutch, a second clutch, and a third clutch, wherein the first and second inputs and the first and second outputs are configured to rotate about a common rotation axis, wherein the first input is coupled by torque engagement to the first drive motor, wherein the second input is coupled to a second drive motor, wherein the first clutch is arranged between the first input and the first output, wherein the second clutch is arranged between the first input and the second output, wherein the third clutch is arranged between the first input and the second input, and wherein the first clutch, the second clutch, and the third clutch are each radially aligned about the common rotation axis; and wherein the housing at least in portions delimits a housing inner chamber, wherein the housing inner chamber is configured to be filled with a cooling fluid, wherein the clutch device and the first drive motor are arranged in the housing inner chamber, wherein the first drive motor includes a stator and a rotor, wherein the rotor is axially overlapping the first clutch, the second clutch, and the third clutch.

2. The drive device of claim 1, wherein the clutch device is connected to the rotor via a connector configured to be U-shaped at least in portions, or is configured disc-shaped or cylindrical.

3. A drive device comprising:
a clutch device that includes a first and second input configured to be rotated above a common rotation axis, a first and second output, and a first input coupled via torque engagement to a first drive motor, a second input configured to be coupled to a second drive motor, and a third clutch, a first clutch is arranged between the first input and the first output, wherein a second clutch is arranged between the first input and the second output, wherein the third clutch is arranged between the first input and the second input; and
a housing that is configured to delimit a first and second housing inner chamber, wherein the first housing inner chamber is free from cooling fluid and second housing inner chamber is configured to be filled with a cooling fluid, wherein the clutch device is arranged in the second housing inner chamber and the first drive motor is arranged in the first housing inner chamber, wherein the first clutch, the second clutch, and the third clutch are arranged axially overlapping a rotor of the first drive motor, and further wherein the first clutch, the second clutch, and the third clutch are each radially aligned about the common rotation axis.

4. The drive device of claim 3, wherein the first drive motor includes a stator,
wherein the rotor is arranged radially outside the first clutch or the second clutch, wherein the rotor is arranged at least partially axially overlapping the first or the second clutch, wherein the stator is arranged radially outside the rotor.

5. The drive device of claim 4, wherein the first clutch and the second clutch are arranged radially overlapping and axially offset to each other, wherein the first clutch includes a first plate carrier and the second clutch includes a second plate carrier, wherein the first plate carrier has a first inner toothing and the second plate carrier has a second inner toothing, wherein the first and the second plate carriers are connected by torque engagement to the rotor.

6. The drive device of claim 5, wherein the clutch device includes a connector that includes a first portion, a second portion and a third portion, wherein the second portion connects the first portion to the third portion, wherein the first portion and the third portion are arranged substantially parallel to the rotation axis, wherein the third portion is arranged on the inside relative to the first portion, wherein the rotor is attached to the first portion radially outside the first portion, wherein the first and second plate carriers are attached to the third portion radially inside the third portion.

7. The drive device of claim 5,
wherein the housing includes a housing portion and at least one sealing element,
wherein the sealing element is arranged between a connector and the housing portion,
wherein the sealing element and the connector are configured to fluidically separate the first housing inner chamber from the second housing inner chamber.

8. A drive device comprising:
a housing configured to delimit a housing inner chamber that is configured to be filled with a cooling fluid; and
a clutch device that includes:
a first input coupled to a first drive motor;
a second input, wherein the first input and second input are configured to be rotated about a common rotation axis;
a first output;
a second output;
a first clutch arranged between the first input and the first output;
a second clutch arranged between the second input and the second output;
a third clutch, wherein the first clutch, the second clutch, and the third clutch are each radially aligned about the common rotation axis; and
a rotor of the first drive motor, wherein the rotor is axially overlapping the first clutch, the second clutch, and the third clutch.

9. The drive device of claim 8, wherein the third clutch is arranged between the first input and the second input.

10. The drive device of claim 9, wherein the first clutch is arranged axially between the third clutch and the second clutch.

11. The drive device of claim 8, wherein the first clutch includes a first plate carrier that includes a first inner toothing.

12. The drive device of claim 11, wherein the second clutch includes a second plate carrier including a second inner toothing, wherein the first and second plate carriers are connected by torque engagement to the rotor of the first drive motor.

13. The drive device of claim 12, wherein the rotor is connected by torque engagement to the first plate carrier or the second plate carrier.

14. The drive device of claim 8, wherein the housing includes a first housing inner chamber and a second housing inner chamber, wherein the second housing inner chamber is configured to be filled with the cooling fluid and the first housing inner chamber is substantially free from cooling fluid.

15. The drive device of claim 14, wherein the clutch device is arranged in the second housing inner chamber and the first drive motor is arranged in the first housing inner chamber.

16. The drive device of claim 8, wherein the first clutch and second clutch are both wet-running clutches.

* * * * *